United States Patent [19]

McHorse

[11] Patent Number: 5,718,471
[45] Date of Patent: Feb. 17, 1998

[54] VEHICLE WITH ANTI-SPILL FUEL FILL DOOR

[75] Inventor: James Vincent McHorse, Portland, Oreg.

[73] Assignee: Freightliner Corporation, Portland, Oreg.

[21] Appl. No.: 641,476

[22] Filed: May 1, 1996

[51] Int. Cl.6 .................................................. B60R 27/00
[52] U.S. Cl. .................................... 296/97.22; 141/86
[58] Field of Search ...................... 296/97.22; 141/86, 141/87

[56] References Cited

U.S. PATENT DOCUMENTS

| | | | |
|---|---|---|---|
| 3,992,051 | 11/1976 | Hitch | 296/97.22 |
| 4,395,070 | 7/1983 | Veltman et al. | 296/97.22 |
| 4,537,437 | 8/1985 | Buccola | 296/97.22 |
| 4,817,691 | 4/1989 | Lau | 141/86 X |
| 5,046,776 | 9/1991 | Shaw | 296/97.22 |
| 5,379,810 | 1/1995 | Marino | 141/86 X |

FOREIGN PATENT DOCUMENTS 65485  3/1991  Japan ........................ 296/97.22

*Primary Examiner*—Joseph D. Pape
*Attorney, Agent, or Firm*—Klarquist Sparkman Campbell Leigh & Whinston

[57] ABSTRACT

An anti-spill fuel fill door overlies a fuel fill line access opening in a panel on a body of a vehicle. The door is pivotable between a closed position covering the access opening and an open position, in which the door is located beneath the access opening. The fuel fill door has a fuel catching reservoir such as a tray that catches fuel spilled during the delivery of fuel when the tray is in the open position. When the door is pivoted to the closed position, the spilled fuel drains from the fuel catching tray behind the panel on the body.

12 Claims, 6 Drawing Sheets

VEHICLE WITH ANTI-SPILL FUEL FILL DOOR

FIELD OF THE INVENTION

The invention relates to an anti-spill fuel fill door for a vehicle and to vehicles, in particular trucks, with such anti-spill fuel fill doors.

BACKGROUND OF THE INVENTION

A vehicle has a fuel fill line, such as a cap and neck type filler, through which fuel is added to a fuel storage tank which is coupled to the engine of the vehicle for delivery of fuel to the engine. The fuel fill line runs from the fuel storage tank and terminates near an exterior panel on the vehicle in a fuel fill line opening. The panel usually has a fuel fill access opening through which the fuel fill line opening can be reached. The fuel fill access opening is generally covered by a fuel fill door, which can be opened when access to the fuel fill line opening is desired for the purpose of delivering fuel. With the door open, a nozzle may be inserted through the access opening into the fuel fill line opening and fuel may be pumped from the nozzle through the fuel fill line to the storage tank.

Frequently during the delivery of fuel, fuel spills or drips from the nozzle and may, on occasion, overflow from the fuel fill line. Spilled fuel is undesirable because fuel is generally messy and odorous.

Spilled fuel is particularly troublesome in truck designs in which the fuel door and fuel fill line opening are located above steps that lead to the cab. Fuel that spills during the delivery of fuel in this truck design generally drips onto the steps. Truckers often track the fuel that spilled on the steps into the cab when they climb the steps to return to the cab. The smell of fuel then permeates the cab and soils carpet in the cab. In addition, spilled fuel is slippery, making travel into and out of the cab less safe.

Therefore, a need exists for an anti-spill fuel fill door directed toward overcoming such problems associated with fuel spillage.

SUMMARY OF THE INVENTION

Accordingly, it is an object of the present invention to provide an improved fuel fill door for a vehicle and a vehicle, such as a truck, with an anti-spill fuel door.

In accordance with one aspect of the present invention, an anti-spill fuel fill door is coupled to a vehicle having a fuel fill line and fuel fill line opening and is movable into a fuel catching position, in which the door is beneath the fuel fill line opening, and includes a fuel holding reservoir, which is also positioned beneath the fuel fill line opening when the door is in the fuel catching position, so that the reservoir catches any fuel that spills during the delivery of fuel to the fuel fill line.

As another aspect of this invention, the door is movable to a fuel dumping position, in which the fuel that was spilled during the delivery of fuel and caught by the reservoir is discharged from the reservoir.

As yet another aspect of this invention, the fuel fill door is pivoted to the body of the vehicle at a horizontal pivot axis beneath the fuel fill line opening and pivots about the horizontal pivot axis when moving from the fuel catching to the fuel dumping position.

More specifically the door may be mounted to a truck that has at least one step for use in entering and exiting the vehicle. In this case, the fuel fill line opening is located above the step so that, when the fuel fill door is in the fuel catching position, the door extends at least partially over the said step to catch fuel that otherwise would spill onto the step. Although less preferred, the fuel door may be designed to simply divert fuel away from the step, rather than initially catching spilled fuel prior to dumping the fuel.

As yet another aspect of this invention, the fuel door and step can be positioned relative to one another so that the step supports the door when the door is in the fuel catching position. In addition, or instead, the fuel door may be provided with a stop for keeping the door in the fuel catching position.

In a more specific implementation of the invention, the door may include multiple fuel catching reservoirs defined by intersecting reinforcing flanges projecting outwardly from the interior surface of the fuel door.

The present invention is directed toward the above objects and advantages individually as well as collectively. These and other objects, advantages and features will become apparent with reference to the following description and drawings.

DETAILED DESCRIPTION OF A PREFERRED EMBODIMENT

Figure 1:
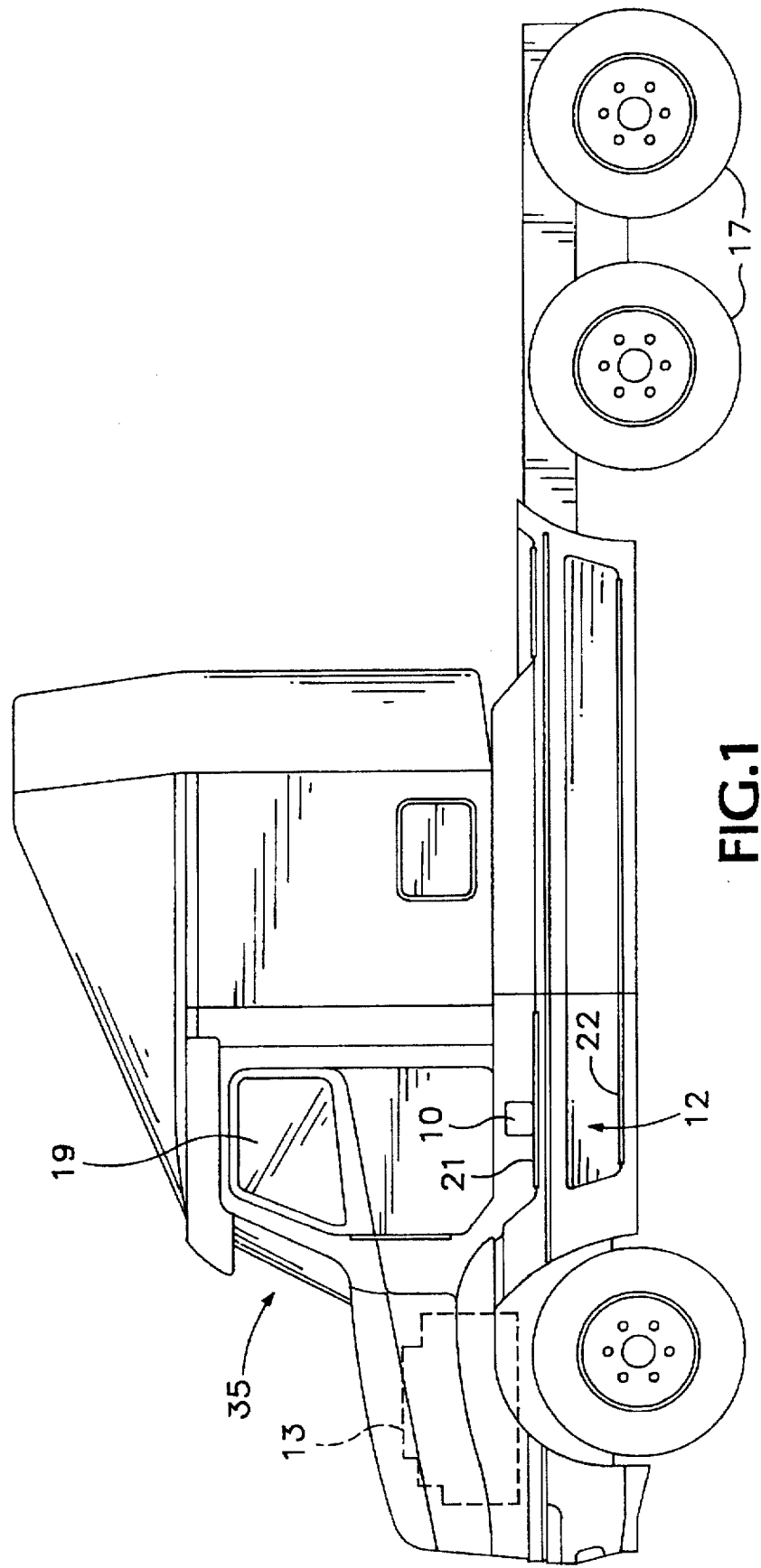
FIG. 1 is a side elevational view of a vehicle with an anti-spill fuel fill door of one embodiment of the invention.
Figure 2:
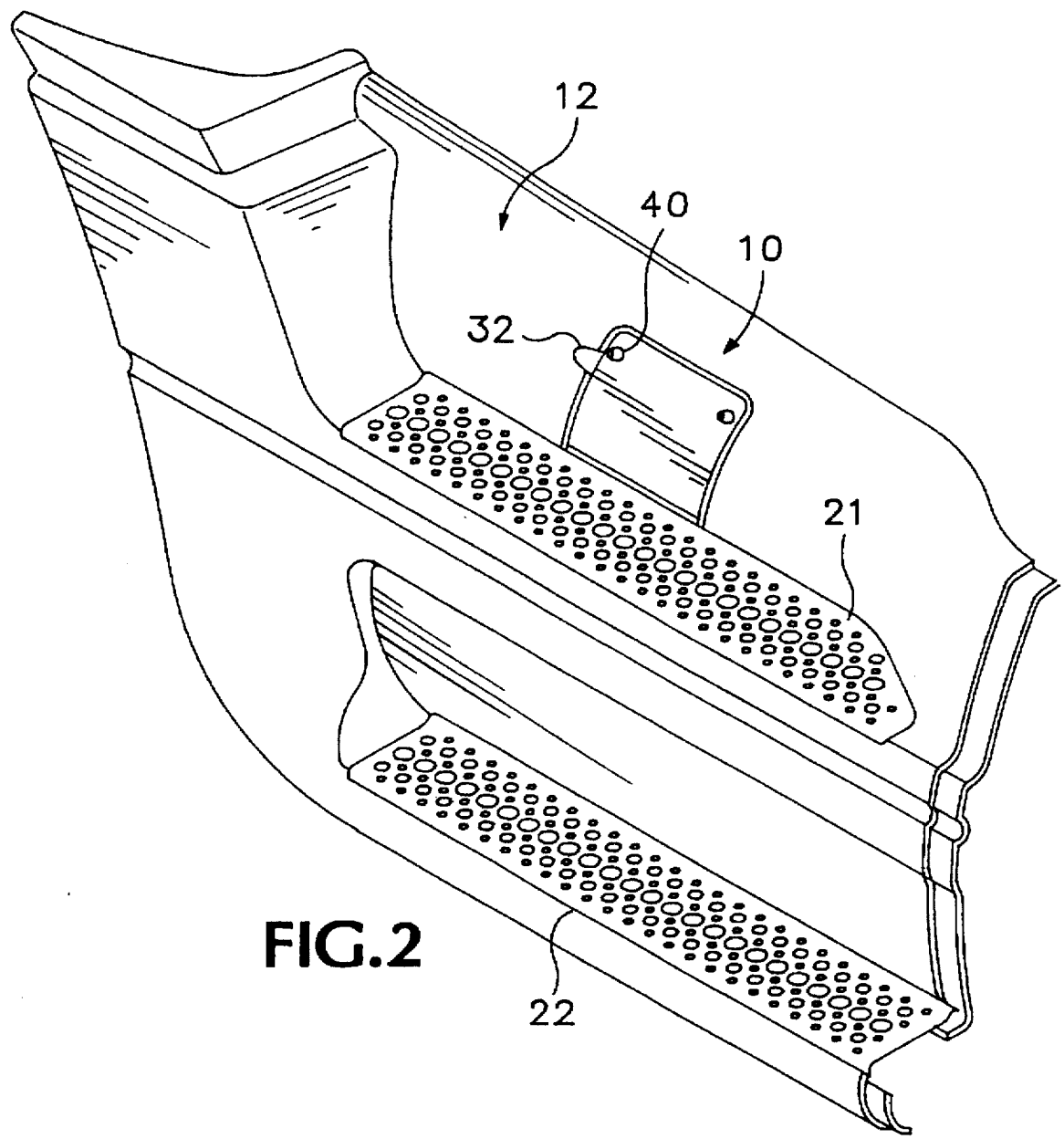
FIG. 2 is a perspective view of a vehicle side fairing panel with an anti-spill fuel fill door of FIG. 1 shown in position to open above a step leading to the cab of the vehicle.
Figure 3:
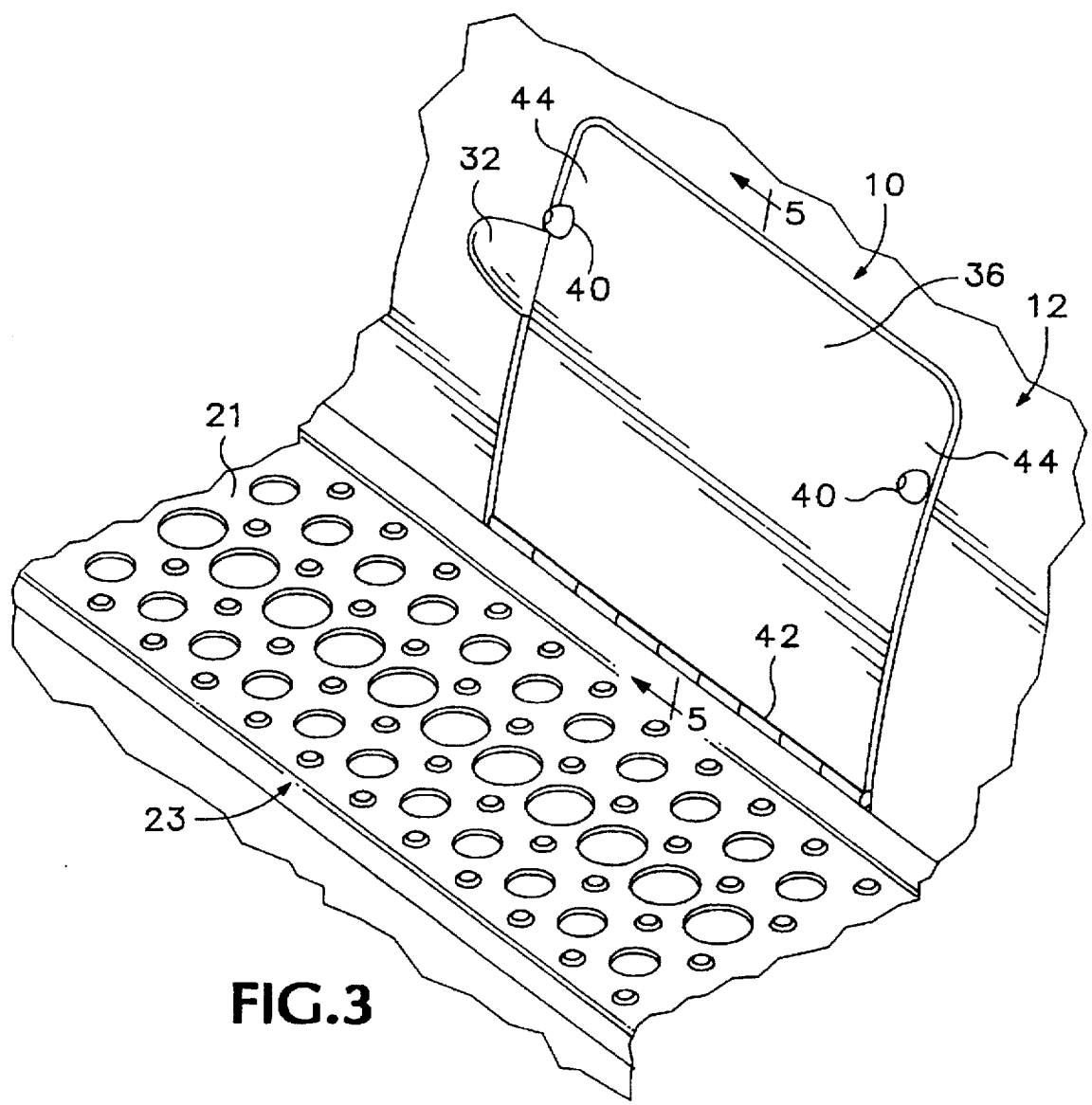
FIG. 3 is a perspective view of the door and a portion of the panel of FIG. 2, the fuel door being shown in a closed position.

One form of a fuel fill door in accordance with the present invention is shown in FIGS. 1, 2 and 3. In these figures, the fuel fill door 10 is attached to a lower side fairing panel 12 on a body 14 of a truck 15. The truck has an engine 13, wheels, such as 17, drivenly coupled to the engine, and a cab 19. The door 10 is pivotably mounted to the panel 12 and is movable between a closed position against the panel 12, as shown in FIGS. 2 and 3, and at least one open position, such as shown in FIG. 4.

Figure 4:
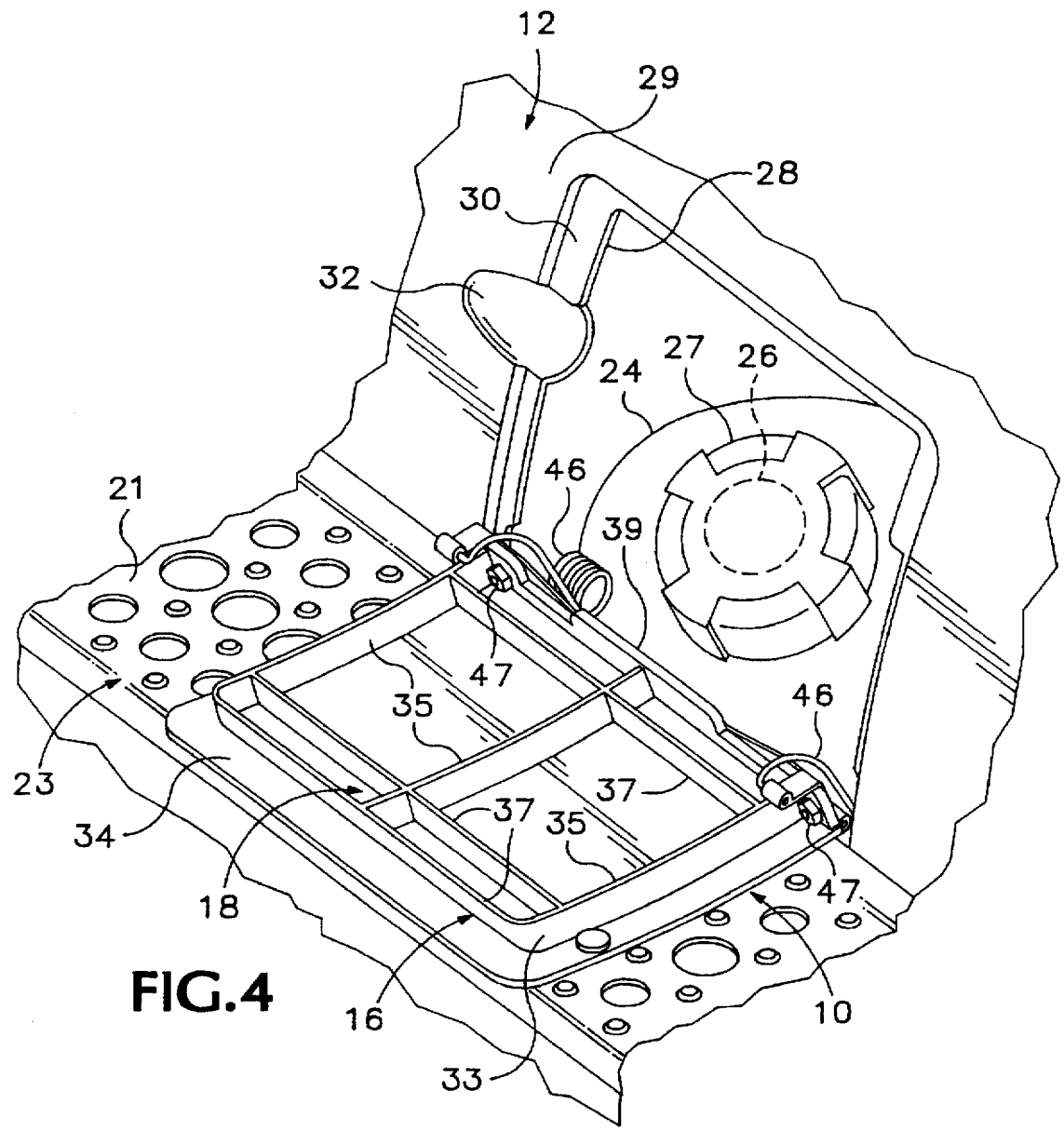
FIG. 4 is a perspective view of a portion of the panel and the door of FIG. 1, with the fuel door shown in an open or fuel catching position.

As shown in FIG. 4, the fuel fill door 10 of the illustrated embodiment has first and second opposed major surfaces with the interior surface having a fuel catching tray 16 with a fuel holding chamber such as a reservoir 18 that catches and retains any fuel that spills during the delivery of fuel when the door is in the open or fuel catching position.

When the door 10 is pivoted to the closed position (FIGS. 3, 5), the reservoir 18 discharges the fuel from the back side of the door 10, and thus the closed position is also referred to as the fuel discharging position.

As shown in FIG. 2, the illustrated panel 12 fits over a frame (not shown) of the truck 15 to form a fairing portion of the body 14 of the truck 15. The illustrated panel 12 is preferably located beneath the cab 19 of the truck 15 and includes steps 21 and 22, as shown in FIG. 1. The panel 12 may be formed of any durable material such as sheet metal, but most preferably is molded of a plastic or fiberglass material such as "GTX" material from General Electric Company. Fuel door 10 may be made of the same material. The steps 21, 22 are used for entering and exiting the cab 19. The illustrated steps 21 and 22 are horizontal and extend perpendicularly outwardly from the main body of the panel 12 and have treads 23, as shown in FIG. 3.

The panel 12 covers various components of the truck including a fuel fill line 24, as shown in FIG. 4. The fuel fill line 24 has a fuel fill opening 26 through which fuel can be delivered, such as from a fuel delivery nozzle for flowing through the fuel fill line 24 to a fuel storage tank (not shown) at the opposite end of the line 24. Generally, the end of the line 24 with the fuel fill opening 26 is threaded and is closed by a cap 27 that screws onto or is otherwise secured to the line 24.

The area of the panel 12 in front of the fuel fill line opening 26 has a fuel fill line access opening 28 to allow selective access to the line 24 from the exterior of the truck 15. In the illustrated embodiment, the access opening 28 is located immediately above the step 21 leading to the cab 20, as shown in FIGS. 1 and 2.

As shown in FIG. 4, the access opening 28 is typically substantially rectangular. The exterior 29 of the panel 12 has a recessed portion bounding the periphery of the access opening 28 that creates a ledge 30 against which the inside perimeter surface of fuel door 10 abuts when the door is in the fuel discharging position. One side of the ledge 30, together with an adjoining portion 29 of the side wall of the panel 12, also defines an inwardly directed thumb-shaped indentation or recess 32. Therefore, a person desiring to fill the fuel line 24 can place a finger behind the interior surface 34 of the tray 16 to pivot the door 10 downwardly from the closed position and about a horizontal pivot axis.

The illustrated door 10 is rectangular and sized slightly larger than the access opening 28 so as to be stopped by the ledge 30 when shifted from an open fuel catching position to the fuel discharging position. The door 10 may have a convex exterior surface 36 that is contoured to conform to the shape of the panel 12, when closed, as shown in FIG. 3. The exterior surface may also be flat or assume other configurations. The exterior surface 36 of the door 10 can thus be viewed as coplanar to the adjacent surface of the panel 12 when the door 10 is closed.

The interior surface 34 of the door 10 defines the tray 16 which accommodates the fuel holding reservoir 18, as shown in FIG. 4. The illustrated fuel holding reservoir 18 catches and (unless so much fuel is spilled that the reservoir 18 overflows) at least temporarily retains fuel spilled during the delivery of fuel to the fuel fill line 24. The door 10 may be tilted when open with the reservoir designed to direct spilled fuel immediately rearwardly through the access opening 28. However, since only small quantities of fuel are typically spilled during any one fuel filling procedure, the illustrated reservoir 18 has ample capacity to hold the spilled fuel until the door is closed and the caught fuel is dumped to the rear side of door 10 through access opening 28.

In the illustrated embodiment, the fuel holding reservoir 18 is formed by a number of intersecting, reinforcing elements such as flanges or ribs 33 projecting outwardly from the interior surface 34. In the illustrated embodiment, the tray 16 has three equally spaced, parallel, vertical ribs 35 and four parallel, horizontal ribs 37 and 39 with the middle two ribs being spaced apart. The configuration of the ribs 35, 37, and 39 creates six fuel catching reservoirs: two small bottom reservoirs, two small top reservoirs, and two large middle reservoirs. The ribs closest to the perimeter of the door in effect define a continuous fuel catching reservoir bounding lip about the door perimeter. The bottom rib 39 of the horizontal ribs is thickened, extends along the entire width of the bottom of the tray 16, and has two notches 41 near the midpoint of each of the bottom reservoirs. Although this configuration is preferred, other reinforcing approaches and configurations would also be suitable, with the most preferred forms defining a fuel capturing reservoir.

The illustrated tray 16 and reservoir 18 are preferably of a unitary, monolithic, one-piece construction and may be molded from plastic or fiberglass, such as sheet molding compound, although other durable materials could be used.

Figure 5:
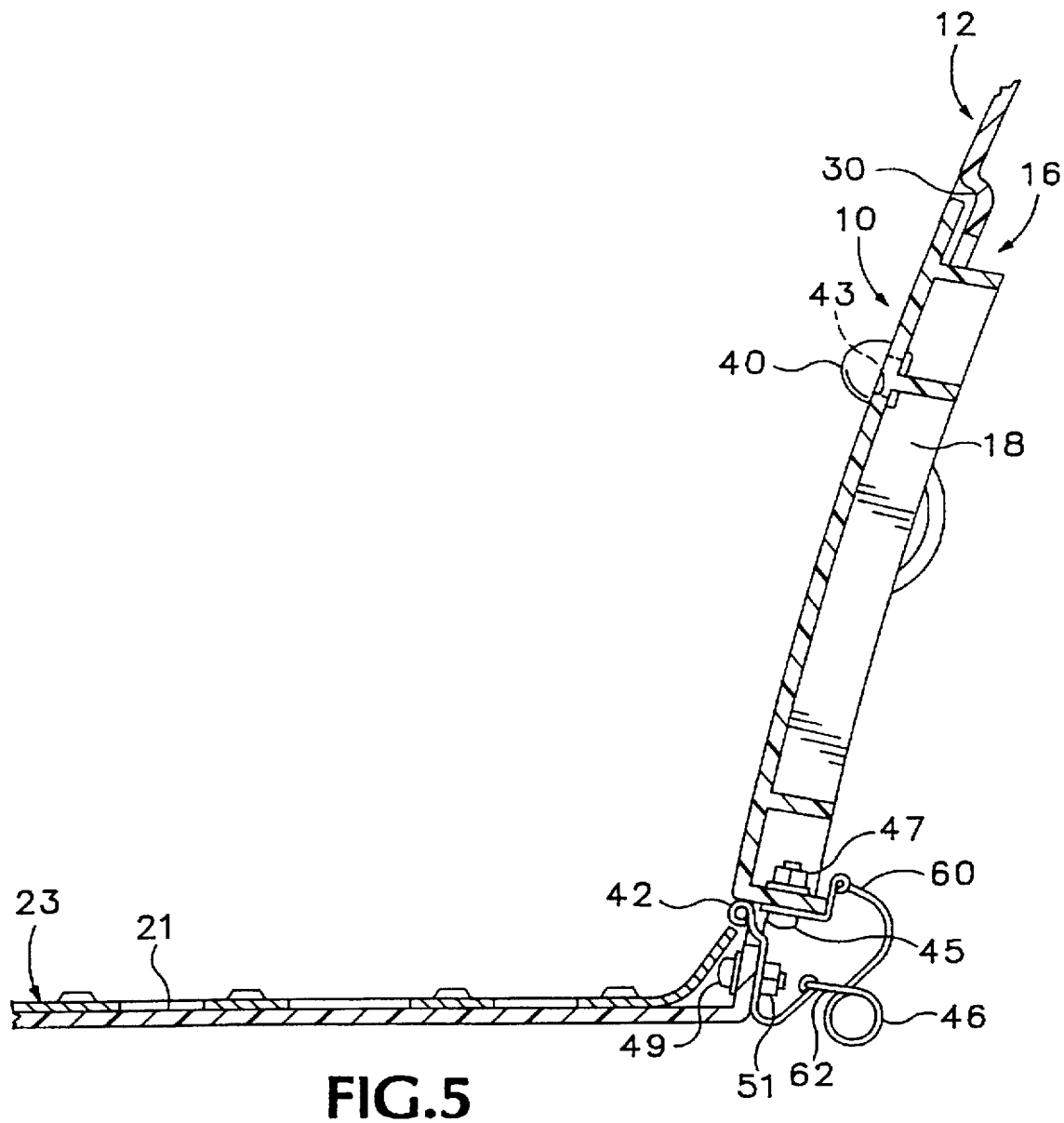
FIG. 5 is a vertical sectional view of the fuel door of FIG. 3 taken along line 5—5 of FIG. 3 and with the door shown in the closed position.

As shown in FIG. 2, the exterior major surface 36 of the illustrated door 10 is provided with a stop, in this case two spaced-apart stops 40, which prevent the door exterior surface 36 from directly contacting the step 21 when the tray 16 is in the open position. The illustrated stops 40 are rounded buttons 41, which may be of rubber, that are press-fit into thru-holes 43 in the upper corner areas 44 of the door 10, as shown in FIGS. 3 and 5. Also, when the tray 16 is in the open position (see FIG. 6), the stops 40 contact the step 21 and thereby provide support for the tray 16 on the step 21 while protecting the exterior surface 36 of the door 10 from being scratched or damaged by the step. Also, if a driver inadvertently steps on the door 10 when open, the door resists breaking because it is supported from below by the step 21 and the hinge and reinforced by the ribs 33, 35, 37. Thus, the ribs reinforce the door to resist breakage if inadvertently stepped on by a driver.

Figure 6:
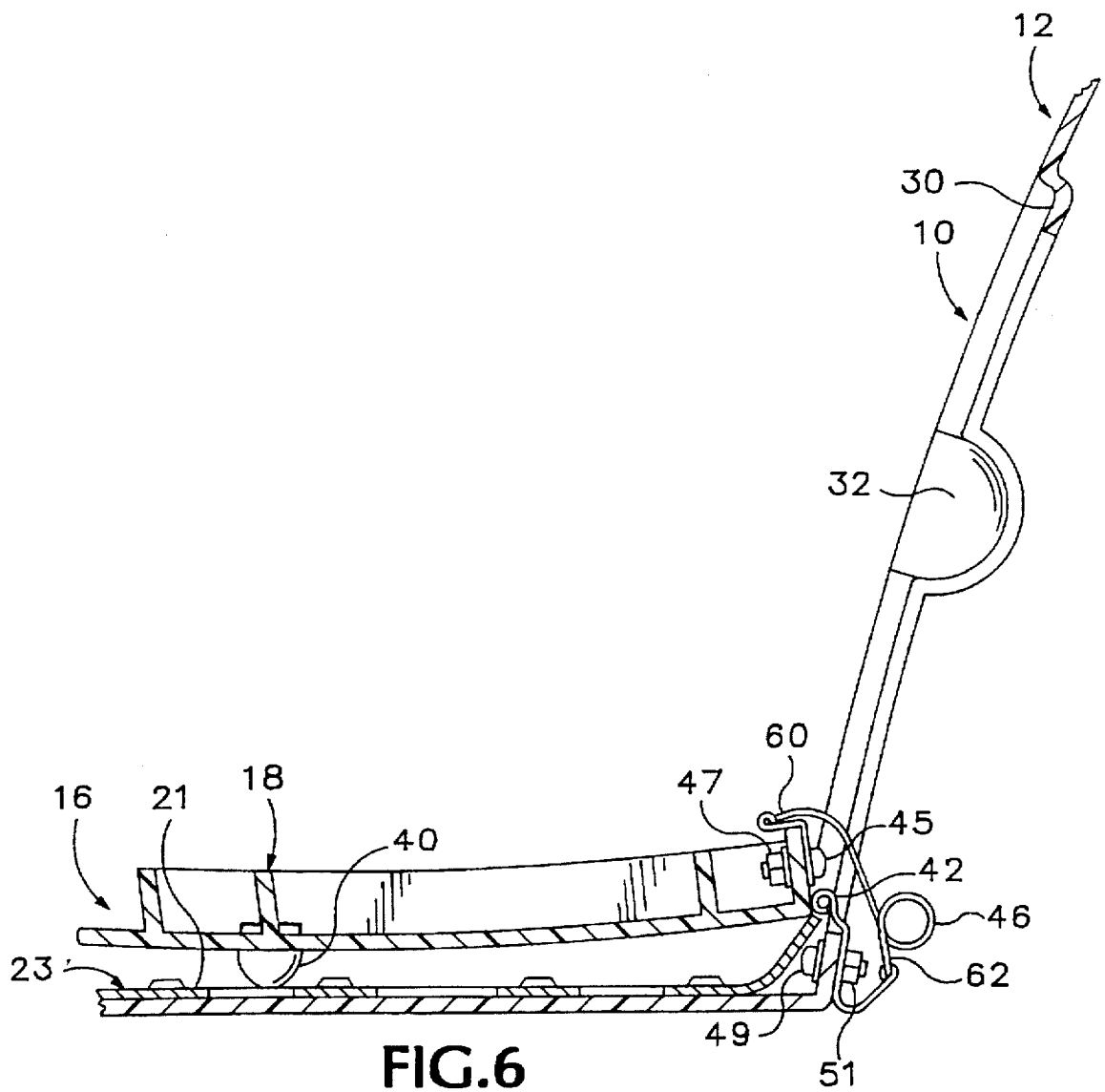
FIG. 6 is a view like that of FIG. 5 with the fuel door shown in an open fuel catching position.

The tray 16 is pivoted along its lower edge to the panel 12 (although it may be pivoted directly to the underlying truck structure) for pivoting movement about a horizontal pivot axis. In this illustrated case, the door 10 has hinge, such as a piano hinge 42, mounted to the bottom horizontal rib 39 by bolts 45 and nuts 47, as shown in FIGS. 3, 5 and 6. The hinge 42 is also mounted to the area of the panel 12 beneath the access opening 28 by bolts 49 and nuts 51 to allow the tray 16 to pivot relative to the panel between the closed and open positions. Other coupling approaches for mounting the door in place may also be used.

Although not required, the tray 16 is biased toward the closed position such as by springs 46 as shown in FIGS. 4–6. The illustrated springs 46 are torsion springs and have one end 60 mounted to the tray 16 and the other end 62 mounted to the panel 12. The ends 60 and 62 may also be mounted indirectly to the tray 16 and panel 12 by mounting to the corresponding leaf of the hinge 42, as shown in FIGS. 5 and 6. The springs 46 can be positioned at a preselected distance from the hinge 42 so that, when the tray 16 is in the open position, the tray 16 is over the center of the spring 46; that is, when a line is drawn between the end 60 of the spring 46 and the end 62, that line runs beneath the center of the spring, as can be seen in FIG. 6. Thus, when the tray 16 is initially moved out of the closed position up to a desired angle from the closed position, the tray 16 will still be biased back to the closed position. However, when the tray 16 is shifted far enough open to reach an open position over the center of the springs 46, the tray will remain open. Again, a biasing mechanism is optional. That is, the door may, for example, simply be latched or otherwise positioned in a closed condition.

In use, a person filling the fuel fill line 24, inserts a finger into the indentation 32 in the panel 12 behind the door 10.

The door 10 is then pulled outwardly from the exterior of the panel 12 against the resistance of the springs 46. As a result, the tray 16 pivots about the horizontal axis of hinge 42 into the open, or fuel catching, position. When the door 10 is in the open position, the stops 40 engage the step 21 and the door 10 is supported by the step 21. Fuel is then delivered to the fuel fill line 24 via a fuel nozzle (not shown). As the nozzle is moved toward or removed from the fuel fill line 24, fuel remaining in the nozzle may drip or spill from the nozzle. Because the tray 16 is in the open position overlying a portion of the step 21, any fuel that drips from the nozzle will land on the tray 16 instead of the step. The fuel holding reservoir 18 provided in the rear surface of door 18 retains, at least temporarily, the fuel.

After delivery of fuel, the tray 16 is pivoted upward about the hinge 42 toward the panel 12. As the door reaches a predetermined position as a result of this upward pivoting, the springs 46 begin to act to bias the door toward the closed position. When the door 10 reaches the closed position, the tray has shifted beyond vertical and is extending slightly backwardly and downwardly toward the interior of the truck 15. In this manner, the reservoir 18 is partially inverted to dump whatever fuel that was caught through the opening 28 and behind the panel 12. Thus, the tray 16 prevents spilled fuel from contacting the step 21 and then disposes of the spilled fuel behind the panel 12, away from a location where the spilled fuel could be tracked into the cab 20.

It should be appreciated that the angle from vertical at which the tray 16 reaches the closed position and the angle at which the ribs 38 project from the tray 16 can be varied to create many configurations in which the fuel would still drain from the holding reservoir 18 when the tray 16 reached the closed position. Also, the tray 16 and ribs 38 or other reservoir defining elements could be configured to allow the fuel to drain from the tray 16 in any of a multiple of fuel discharging positions before reaching the fully closed position, while still preventing the fuel from spilling on the steps 21 and 22.

The anti-spill fuel fill door prevents spilled fuel from dripping onto the steps below the cab. Thus, the door minimizes the risk of truckers tracking fuel spilled on the steps into the cab above the steps. The door also enhances safety by minimizing the possibility of fuel, which is a slippery material or lubricant, ending up on the step where it may cause a trucker to slip when entering or leaving the truck cab. Therefore, the door provides a clean way of catching and disposing of spilled fuel.

This description illustrates one embodiment of the present invention and should not be construed to limit the scope of the invention in any way. Other modifications and variations may be made to the assembly described without departing from the invention as defined by the appended claims and their equivalents. For instance, it is contemplated that the invention could be used with other fuel additives.

I claim:

1. In a vehicle having a fuel fill line with a fuel receiving opening through which fuel is delivered for use by the vehicle, the vehicle having at least one step for use during entry and egress from the vehicle, the fuel receiving opening being positioned above said at least one step, a fuel spill catching assembly comprising:

a fuel catching tray coupled to the vehicle and movable to a fuel catching position beneath the fuel receiving opening;

the fuel catching tray including a fuel holding reservoir positioned beneath the fuel receiving opening when the fuel catching tray is in the fuel catching position so as to catch fuel which spills during delivery of fuel to the fuel fill line; and the fuel catching tray being movable to a fuel dumping position in which the fuel holding reservoir is tilted to dump fuel from the fuel reservoir following the delivery of fuel to the fuel fill line;

and wherein the fuel tray, when the fuel tray is in the fuel spill catching position, extends at least partially over said at least one step to catch spilled fuel that otherwise would fall onto said at least one step.

2. A fuel spill catching assembly according to claim 1 in which the fuel tray has an exterior surface and an interior surface and at least one stop projecting from the exterior surface of the fuel tray in a position to engage said at least one step when the tray is in the fuel catching position such that the stop provides support for the tray.

3. The fuel spill catching assembly according to claim 1 in which the fuel tray has an interior surface and includes a plurality of fuel catching reservoirs defined by intersecting reinforcing ribs or flanges projecting outwardly from the interior surface of the fuel tray.

4. In a vehicle having a fuel fill line with a fuel receiving opening through which fuel is delivered for use by the vehicle, a fuel spill catching assembly comprising:

a fuel catching tray coupled to the vehicle and movable to a fuel catching position beneath the fuel receiving opening;

the fuel catching tray including a fuel holding reservoir positioned beneath the fuel receiving opening when the fuel catching tray is in the fuel catching position so as to catch fuel which spills during delivery of fuel to the fuel fill line;

the fuel catching tray being movable to a fuel dumping position in which the fuel holding reservoir is tilted to dump fuel from the fuel reservoir following the delivery of fuel to the fuel fill line; and a fuel spill catching assembly in which said one major surface is generally convex.

5. In a vehicle having a fuel fill line having a fuel fill opening accessible through an access opening, a fuel fill door comprising a panel for selectively covering the access opening, the panel including a fuel catching chamber positioned to catch spilled fuel during delivery of fuel to the fuel fill line;

wherein the panel is mounted to the vehicle and movable between a closed position in which the panel overlies the access opening and at least one open position in which the access opening is not overlaid by the panel, the fuel catching chamber being positioned below the access opening and in a position to catch spilled fuel when the panel is in an open position; and in which the panel pivots through vertical, when moving between the open position and the closed position, so that in the closed position the chamber is at least partially inverted such that fuel drains from the chamber.

6. In a vehicle having a fuel fill line having a fuel fill opening accessible through an access opening, a fuel fill door comprising a panel for selectively covering the access opening, the panel including a fuel catching chamber positioned to catch spilled fuel during delivery of fuel to the fuel fill line;

wherein the panel is mounted to the vehicle and movable between a closed position in which the panel overlies the access opening and at least one open position in which the access opening is not overlaid by the panel, the fuel catching chamber being positioned below the access opening and in a position to catch spilled fuel when the panel is in an open position; and in which the panel has a major surface and includes a lip which projects outwardly from a major surface of the fuel door to define the fuel catching chamber, the lip projecting upwardly from the panel when the panel is in the open position, the lip being shaped to discharge fuel from the chamber when the panel is in the closed position.

7. A vehicle panel with a fuel fill door assembly for mounting to a vehicle having a fuel fill line with a fuel fill opening through which fuel is delivered to the fuel fill line, the vehicle panel comprising:

a panel body defining a fuel fill line access opening, the panel body being mounted to the vehicle with the fuel fill line access opening positioned to provide access therethrough to the fuel fill opening;

a fuel fill door mounted to the panel for selective movement between a closed position closing the fuel fill line access opening and at least one open position opening the access opening to permit delivery of fuel through the access opening and fuel fill opening to the fuel fill line, the door including a fuel retaining chamber positioned below the fuel flow access opening when the door is in an open position for catching fuel that may spill during delivery of fuel to the fuel fill line; and in which the vehicle includes a step located beneath the fuel fill opening and further comprising at least one stop mounted to the door in position to engage the step when the door is in said one open position.

8. A vehicle panel with a fuel fill door assembly for mounting to a vehicle having a fuel fill line with a fuel fill opening through which fuel is delivered to the fuel fill line, the vehicle panel comprising:

a panel body having an exterior and an interior surface, the panel body defining a fuel fill line access opening, the panel body being mounted to the vehicle with the fuel fill line access opening positioned to provide access therethrough to the fuel fill opening; and a fuel fill door coupled to the vehicle for selective movement between a closed position closing the fuel fill line access opening and at least one open position opening the access opening to permit delivery of fuel through the access opening and fuel fill opening to the fuel fill line;

the vehicle panel including at least one step positioned below the fuel fill line access opening for use during ingress and egress from the vehicle, the panel overlying at least a portion of the step when the panel is moved to the open position; and the panel including a fuel diverter positioned to direct spilled fuel away from the step as fuel is delivered to the fuel fill line.

9. A vehicle panel according to claim 8 in which the fuel fill door includes an interior surface, and in which the fuel diverter comprises ribs projecting outwardly from the interior surface of the fuel fill door and into the access opening when the fuel fill door is in a closed position.

10. In a vehicle having a fuel fill line having a fuel fill opening accessible through an access opening, a fuel fill door comprising a panel for selectively covering the access opening, the panel including a fuel catching chamber positioned to catch spilled fuel during delivery of fuel to the fuel fill line; and in which the panel includes a major surface and a continuous lip projecting outwardly from the major surface to define the fuel catching chamber.

11. The fuel fill door of claim 10 in which the panel includes a lower edge, the lip includes a notch near the lower edge, and the panel is movable into a fuel dumping position, in which the notch facilitates dumping the fuel from the fuel catching chamber, the notch being configured so as to allow the fuel catching chamber to continue to catch spilled fuel.

12. In a vehicle having a fuel fill line having a fuel fill opening accessible through an access opening, a fuel fill door comprising a panel for selectively covering the access opening, the panel including a fuel catching chamber positioned to catch spilled fuel during delivery of fuel to the fuel fill line;

wherein the panel is mounted to the vehicle and movable between a closed position in which the panel overlies the access opening and at least one open position in which the access opening is not overlaid by the panel, the fuel catching chamber being positioned below the access opening and in a position to catch spilled fuel when the panel is in an open position; and further comprising a spring having a first end and a second end, the first end being mounted to the vehicle and the second end being mounted to the panel, the panel and spring arranged so that in at least one open position the panel is over the center of the spring, whereby the panel is maintained in the said one open position.

* * * * *